June 7, 1949. P. G. SKINNER 2,472,348
MEASURING OR COMPARING DEVICE
Filed Nov. 21, 1944

Inventor
P. G. Skinner
By Haseltine Lake
Attys.

Patented June 7, 1949

2,472,348

UNITED STATES PATENT OFFICE 2,472,348

MEASURING OR COMPARING DEVICE

Peter Graham Skinner, Cook Hill, near Alcester, England, assignor to Morris Motors Limited, Cowley, England Application November 21, 1944, Serial No. 564,516
In Great Britain December 8, 1943

1 Claim. (Cl. 250—41.5)

This invention relates to apparatus for measuring or comparing the dimensions or forms of objects such as, for example, work pieces of cylindrical, tapered or other forms, the apparatus being of the kind in which an illuminated light-sensitive means is used in association with an electrical indicating or recording instrument. The object of the invention is to provide an improved apparatus in which variations in the brightness of an electric light source (due to variations in the voltage applied to the source) are automatically compensated.

Broadly the invention comprises an apparatus of the kind aforesaid in which there is interposed between the light source and the light sensitive means, a reflector with electrical actuating means responsive to the same voltage as the light source, this reflector being adapted to deflect the light beam relatively to the light sensitive means in a direction at right angles to the direction in which the beam is deflected by another reflector responsive to the object undergoing examination.

In particular the invention also comprises an apparatus as hereinafter described.

In the accompanying sheet of explanatory diagrams:

Figure 1:
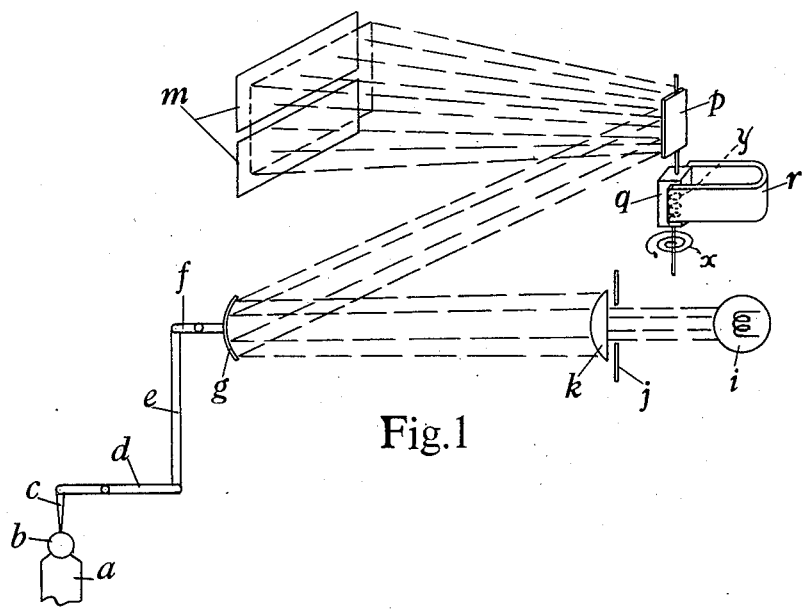
Figure 1 illustrates one mode of carrying the invention into effect.
Figure 2:
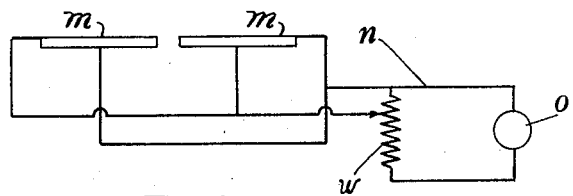
Figures 2 and 3 illustrate electric circuital connections.

As shown in Figure 1, I employ in conjunction with a support $a$ for a moving object $b$ (herein termed the work piece) to be tested, a feeler $c$ carried by one end of a lever $d$ and adapted to bear lightly on the work piece, the lever being pivoted on a fixed axis at a position intermediate its ends. At the end remote from the feeler $c$ the lever $d$ is connected by a link $e$ to one end of another lever $f$ which is also pivoted on a fixed axis at a position intermediate its ends. The end of the lever $f$ remote from the link $e$ carries a concave reflector $g$ situated on the optical axis of a light projector which consists of a filament lamp or other electric light source $i$, an apertured screen $j$, and a light-projecting lens $k$, the arrangement being such that the light beam from the source is directed on to the reflector which serves to divert the light beam. Also I employ light sensitive means consisting of a pair of adjacent photoelectric cells $m$ of any convenient kind. These cells $m$ are arranged side by side and connected in parallel and opposed relationship to an electric circuit $n$ (Figure 2) containing an adjustable resistance $w$ and a galvanometer $o$ so that when the cells are equally illuminated they produce equal and opposite effects on the galvanometer, the latter being only responsive to differential illumination of the two cells.

Figure 3:
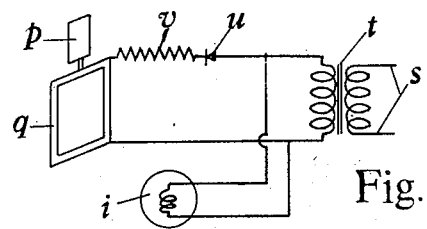

According to the main feature of my invention I employ for directing the diverted light beam from the reflector $g$ on to the cells $m$, another movable reflector $p$ provided with electrical actuating means responsive to the same voltage as the light source. In the example shown the reflector $p$ is carried on a pivotal member $q$ which is situated between the poles of a permanent magnet $r$, the said member being loaded by a spring $x$, and having a winding $y$ adapted for connection to the same source of current supply as the light source $i$. A mode of connecting the winding of the member $q$ and the light source $i$ to the same source of current supply is illustrated in Figure 3 in which $s$ indicates current supply leads, and $t$ a step-down transformer having its primary winding connected across the supply leads. The member $q$ and the light source $i$ are connected in parallel to the secondary winding of the transformer $t$, the circuit of the said member containing a rectifier $u$ and a resistance $v$. By this arrangement the member $q$, which forms the electrical actuating means of the reflector $p$, is responsive to the same voltage as the light source $i$.

The above described arrangement is such that the beam from the source $i$ is first received by the reflector $g$ associated with the feeler $c$, and is then diverted to the second reflector $p$. From the reflector $p$ the light beam passes to the two cells $m$. The adjustment is such that with a normal voltage applied by the transformer $t$ (Figure 3) to the light source $i$, and with the feeler $c$ in some predetermined position, both cells $m$ are equally illuminated, and the galvanometer $o$ is not actuated. Assuming that while in contact with the moving work piece $b$ the feeler $c$ is displaced (due to variation of shape or size of the work piece), the first reflector $g$ will receive a corresponding movement which will cause the angle through which the light beam is diverted by this reflector to be altered so that one cell $m$ will be illuminated more than the other. This condition will be indicated or recorded by the galvanometer $o$ which will be deflected through a distance depending on the amount of differential illumination of the two cells, and thus on the amount of the variation of shape or size of the work piece. Assuming, however, that a variation occurs in the supply voltage (which would otherwise cause the galvanometer $o$ to be actuated independently of the feeler $c$), the second reflector $p$ will move in a direction which will deflect the light beam in a direction at right angles to the deflection caused through the first reflector $g$ by the feeler. This movement of the second reflector $p$ has the effect of diminishing or increasing the area of the cross section of the beam which impinges on both cells $m$, and therefore merely alters the quantity of light falling on the two cells without varying the response of the cells to movement of the first reflector $g$ by the feeler $c$. By appropriate adjustment the arrangement is adapted to operate so that the galvanometer $o$ is affected only by movements of the feeler $c$.

By this invention the automatic compensation of variations in the brightness of the light source is performed in a very simple and satisfactory manner. The invention is not, however, restricted to the example above described as subordinate details may be modified to suit different requirements.

Having thus described my invention what I claim as new and desire to secure by Letters Patent is:

Apparatus of the kind specified for measuring or comparing the dimensions or forms of objects, comprising the combination of an electric light source, a pair of photo-electric cells arranged side by side and electrically interconnected in parallel and opposed relationship, an electrical instrument electrically connected to said cells so as to be responsive to differential illumination thereof, a movable reflector for diverting the light beam emanating from said light source, a support for the objects to be examined, a movable feeler arranged to bear on the objects placed on said support, means interconnecting said reflector and feeler so that said reflector is movable for deflecting the diverted light beam in response to variations in size and shape of the objects to be examined, and a second movable reflector for directing the light beam from the first reflector on to said photo-electric cells, said second reflector having electrical actuating means responsive to the same voltage as said light source, and being arranged to deflect the light beam relatively to said cells in a direction at right angles to that in which the light beam is deflected by said first reflector, so that movement of said second reflector serves to vary the cross sectional areas of the beam impinging on both of said cells without varying the response of said cells to movement of said first reflector.

PETER GRAHAM SKINNER.

REFERENCES CITED

The following references are of record in the file of this patent:

UNITED STATES PATENTS

| Number | Name | Date |
|---|---|---|
| Re. 21,309 | Harrison | Dec. 26, 1939 |
| 1,854,760 | Paulson | Apr. 19, 1932 |
| 2,065,365 | Doyle et al. | Dec. 22, 1936 |
| 2,122,818 | Ladrach | July 5, 1938 |
| 2,224,281 | Webber | Dec. 10, 1940 |
| 2,246,884 | Johnson | June 24, 1941 |
| 2,397,971 | Martinec | Apr. 9, 1946 |